US009282353B2

(12) United States Patent
Davis et al.

(10) Patent No.: US 9,282,353 B2
(45) Date of Patent: Mar. 8, 2016

(54) VIDEO METHODS AND ARRANGEMENTS

(75) Inventors: Bruce L. Davis, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 538 days.

(21) Appl. No.: 13/078,582

(22) Filed: Apr. 1, 2011

(65) Prior Publication Data

US 2011/0247027 A1 Oct. 6, 2011

Related U.S. Application Data (60) Provisional application No. 61/320,676, filed on Apr. 2, 2010.

(51) Int. Cl.
*H04N 7/16* (2011.01)
*H04N 7/10* (2006.01)
*H04N 7/025* (2006.01)
*H04N 21/2543* (2011.01)
*H04N 21/266* (2011.01)
*H04N 21/6334* (2011.01)
*H04N 21/81* (2011.01)

(52) U.S. Cl.
CPC .... *H04N 21/25435* (2013.01); *H04N 21/26613* (2013.01); *H04N 21/63345* (2013.01); *H04N 21/812* (2013.01)

(58) Field of Classification Search
USPC ...................................... 725/5, 32, 34–36, 42
See application file for complete search history.

(56) References Cited

U.S. PATENT DOCUMENTS

| 5,027,400 | A | | 6/1991 | Baji et al. |
| 5,532,735 | A | * | 7/1996 | Blahut et al. .................... 725/32 |
| 5,838,314 | A | * | 11/1998 | Neel et al. ......................... 725/8 |
| 6,057,872 | A | * | 5/2000 | Candelore ....................... 725/23 |
| 6,177,931 | B1 | * | 1/2001 | Alexander et al. .............. 725/52 |
| 6,446,130 | B1 | | 9/2002 | Grapes |
| 6,553,178 | B2 | | 4/2003 | Abecassis |
| 6,915,271 | B1 | | 7/2005 | Meyer et al. |
| 7,055,166 | B1 | | 5/2006 | Logan |
| 7,346,545 | B2 | | 3/2008 | Jones |
| 7,761,327 | B1 | | 7/2010 | Hannah |
| 7,806,329 | B2 | | 10/2010 | Dmitriev et al. |
| 8,094,949 | B1 | | 1/2012 | Rhoads |
| 2001/0020242 | A1 | | 9/2001 | Gupta |
| 2001/0056374 | A1 | | 12/2001 | Joao |

(Continued)

*Primary Examiner* — Nasser Goodarzi
*Assistant Examiner* — Fred Peng
(74) *Attorney, Agent, or Firm* — Digimarc Corporation (57) ABSTRACT

Novel arrangements are detailed involving delivery of entertainment content, and commercial sponsorship of such content. Some arrangements enable viewers to control presentation of advertising in video, e.g., selecting what commercials are to be presented—if any, and also their order and timing. Ad presentation can also be made dependent on context. Other arrangements ensure that advertising is actually rendered, and is not skipped-over. In still other aspects, entertainment content that is now offered on a paid basis is made available for free to certain viewers. For example, viewers may receive free content as a perk for earlier patronage of certain content sponsors. Fees charged to advertisers can be tied to measured consumer responses (e.g., to correlated increases in sales of advertised products), or to the demographics of the responding viewers (e.g., engagement of affluent consumers merits higher fees). A great number of other features and arrangements are also detailed.

16 Claims, 5 Drawing Sheets

(56) References Cited

U.S. PATENT DOCUMENTS

| | | |
|---|---|---|
| 2001/0056573 A1 | 12/2001 | Kovac |
| 2002/0092017 A1 | 7/2002 | Klosterman et al. |
| 2002/0116266 A1 | 8/2002 | Marshall |
| 2003/0012548 A1 | 1/2003 | Levy et al. |
| 2003/0022622 A1* | 1/2003 | Weinblatt et al. ............ 455/3.06 |
| 2003/0192060 A1 | 10/2003 | Levy |
| 2005/0096975 A1 | 5/2005 | Moshe |
| 2005/0120391 A1 | 6/2005 | Haynie et al. |
| 2005/0283401 A1 | 12/2005 | Swix et al. |
| 2006/0168609 A1* | 7/2006 | Chen ................................ 725/9 |
| 2007/0061724 A1 | 3/2007 | Slothouber et al. |
| 2007/0106557 A1* | 5/2007 | Varghese ........................ 705/14 |
| 2007/0288951 A1 | 12/2007 | Ray et al. |
| 2008/0127249 A1* | 5/2008 | Cruice ............................ 725/34 |
| 2008/0196060 A1* | 8/2008 | Varghese ........................ 725/34 |
| 2008/0221986 A1 | 9/2008 | Soicher et al. |
| 2009/0125936 A1* | 5/2009 | Kulasekaran et al. .......... 725/32 |
| 2009/0182589 A1 | 7/2009 | Kendall et al. |
| 2009/0249388 A1* | 10/2009 | Seidel et al. ..................... 725/32 |
| 2009/0265214 A1 | 10/2009 | Jobs et al. |
| 2010/0011394 A1 | 1/2010 | Lee et al. |
| 2010/0042692 A1 | 2/2010 | Irwin et al. |
| 2010/0257037 A1 | 10/2010 | Matz et al. |
| 2010/0306805 A1 | 12/2010 | Neumeier et al. |
| 2011/0154200 A1 | 6/2011 | Davis et al. |
| 2011/0218884 A1* | 9/2011 | Kothari et al. ............... 705/27.1 |
| 2011/0276882 A1 | 11/2011 | Buehler et al. |
| 2013/0007782 A1* | 1/2013 | Marshall et al. .................. 725/5 |
| 2013/0055306 A1* | 2/2013 | Macrae et al. .................. 725/32 |

* cited by examiner

VIDEO METHODS AND ARRANGEMENTS

RELATED APPLICATION DATA

This application is a non-provisional of application 61/320,676, filed Apr. 2, 2010.

The present technology is related to that detailed in the assignee's application Ser. No. 12/271,772, filed Nov. 14, 2008 (published as 20100119208); Ser. No. 12/490,980, filed Jun. 24, 2009 (published as 20100205628); Ser. No. 12/695,903, filed Jan. 28, 2010 (published as 20100222102); and Ser. No. 12/716,908, filed Mar. 3, 2010 (published as 20100228632).

This technology also concerns improvements to Apple's published patent application 20090265214 (Jobs et al).

The principles and teachings from the just-cited work are intended to be applied in the context of the arrangements detailed below, and vice versa. (The disclosures of these previous patents and applications are incorporated herein by reference.)

TECHNICAL FIELD

The present technology relates to entertainment content and its use, e.g., in connection with advertising and commercial sponsorship.

Introduction

In the cited Apple patent application, Jobs et al propose restricting a user's enjoyment of video through use of controls imposed by the operating system. For example, the operating system (OS) may interrupt viewing of a movie presentation when the OS decides it is time to play an advertisement. Movie playback won't resume unless the user confirms viewing of the advertisement, such as by clicking a button during its presentation.

In accordance with certain aspects of the present technology, advertising is presented in entertainment content under the control of the content producers and/or the viewers, rather than the operating system.

In accordance with other aspects of the present technology, entertainment content that is now offered on a subscription-only basis is made available for free to certain viewers.

The foregoing and a great many other features and advantages of the present technology will be more readily apparent from the following detailed description, which proceeds with reference to the accompanying drawings.

DETAILED DESCRIPTION

In its first era, television was dominated by the "big three" broadcast networks. Advertisers paid the bills, such as Geritol on The Lawrence Welk Show, and Mattel on The Wonderful World of Disney. Viewers—often in family groups—passively watched from the rec room sofa.

In the current, second, era, scores of specialized channels are cannibalizing the oligopoly of the television networks. Advertising still persists (often for Viagra or other pharmaceuticals), yet consumers are increasingly paying subscription charges to view television programming. Households may have multiple screens, with different audiences viewing in the den, kitchen, bedrooms, etc.

A new, third, era of television will doubtless emerge. According to certain embodiments of the present inventors' conception, this next era can feature a return to free TV, with viewers essentially being rewarded for engaging with sponsors of the content. The media will be re-socialized—not with family on the sofa, but with friends and other affinity groups—often physically separated, yet in each others' electronic presence.

Figure 1:
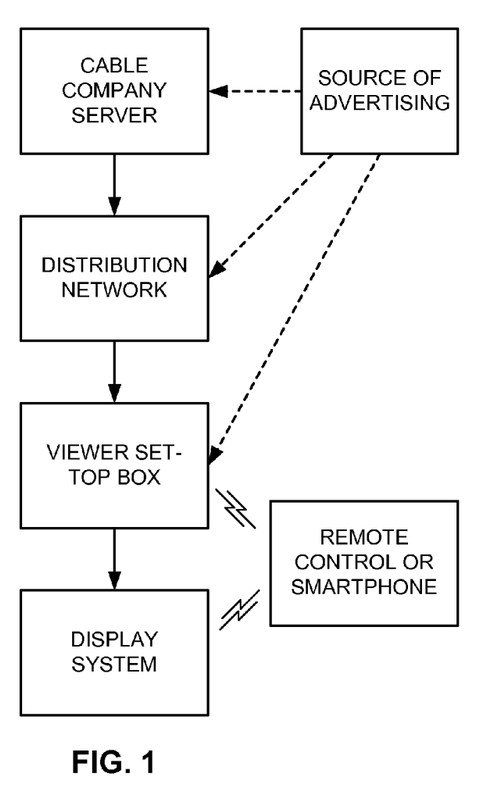
FIG. 1 shows a typical system for distribution and viewing of entertainment content, and advertising.

FIG. 1 shows a typical system arrangement. A cable company server provides video data across a distribution network to equipment at a subscriber's home. This equipment may include a set-top box and a display system. The set-top box is essentially a computer, with familiar elements such as a processor, memory, input and output interfaces, etc. The set-top box and display system may be responsive to a remote control (which may be a smart phone).

Somewhere in the system is a source of advertising audio/video (or there may be several sources). This advertising may be provided using the cable company's server(s), or it may be delivered otherwise, such as across the internet, by a wireless network, etc. (shown by dashed arrows).

Figure 2:
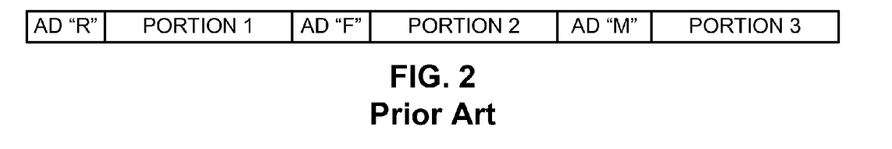
FIG. 2 shows a prior art arrangement by which advertising is interspersed with video entertainment programming.

FIG. 2 shows a familiar sequence of television—different portions of a TV program are interspersed with one or more commercials. (The commercials may be presented in arbitrary order, as indicated by advertisement "F" following advertisement "R," etc.)

The advertisers, and the content distributors, are naturally interested in ensuring that viewers don't simply fast forward through the commercials. One way in which this can be done is to encrypt the different portions of the programming with different cryptographic keys, which require some processing of the advertising to obtain. To view Portion 2 of the program, for example, the viewer must render one or more preceding advertisements, such as advertisement "F." Through use of this advertising data the viewer's device is able to discern a cryptographic key needed to decrypt and render Portion 2.

The cryptographic key may be conveyed steganographically in the advertisement, such as by a digital watermarking technique. To ensure robustness against corruption, digital watermarking techniques commonly embed their payloads redundantly through the encoded content. This means that a cryptographic key conveyed by the advertisement may be decoded from just a short excerpt of the ad. To prevent recovery of the complete key from rendering only the first seconds of an ad, and then fast-forwarding through the rest of the ad, the cryptographic key may be divided into portions. For example, a first part of the cryptographic key may be conveyed by the first ten seconds of a 30 second ad, with second and third parts conveyed by successive portions. Only by rendering the ad in its entirety is the entire key recovered.

If the key is conveyed steganographically, the watermark decoder should require that the advertisement be rendered in order for the key to be extracted. One way this can be accomplished (among others) is to arrange the watermark decoder to operate on decompressed video data. If portions of the advertisement are skipped, the associated video data is not decompressed and rendered—preventing recovery of the watermark key payload.

Note that such an arrangement does not require the advertisement to be known at the time the program portion is encrypted. An arbitrary key can be used for the encryption operation. This value can later be steganographically encoded into any advertisement data—on the fly by the video distributor at the time of delivery, or earlier.

The cryptographic key that locks access to portions of the video program need not be conveyed steganographically; other arrangements are also practical. For example, if the advertisement is known at the time the video is encrypted, the encryption key can be selected based on the advertisement content. For example, the first 256 bits of advertisement video data can serve as the key. Or a hash, or other fingerprint, can be computed based on some or all of the advertisement data, and this value can serve as the encryption key. A following portion of the video program is then encrypted using this derived key. Again, unless the advertisement is rendered, the key is not discovered, and the entertainment programming cannot be unlocked.

The cryptographic key may be conveyed independently of the advertising content, yet require processing of the advertisement(s) to assure its recovery. For example, the length of the commercial(s) that precede a portion of a video program—in milliseconds, video frames, MPEG I, B and or P frames—can serve as a simple key by which the portion can be encrypted. Unless the commercials are processed by a suitable decoder in the subscriber's equipment, and this length data is recovered, the encrypted video cannot be rendered.

In another arrangement, a nearly black frame can be interposed by the distributor between or after advertisement(s), and can convey the encryption key itself. The first 256 pixels of this frame (or pixels at any other known location) can have luminance values of 1 or 0, to convey a 256-bit cryptographic key. Since the user does not know the length of the preceding commercial(s), the location of the nearly black frame is difficult to predict, so the commercial(s) cannot be fast-forwarded without risk of skipping the key-containing frame.

Figure 3:
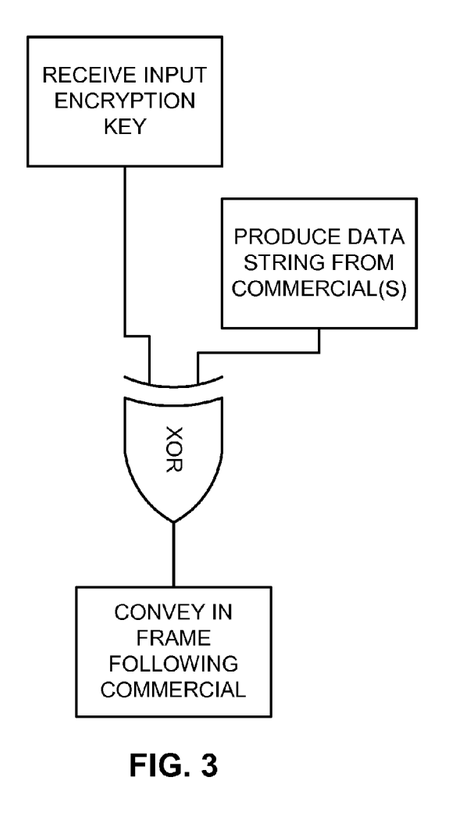
FIG. 3 shows an arrangement which data allowing decryption of entertainment content can be generated in accordance with encryption key information and arbitrary data from one or more advertisements, and conveyed with the content.

In a more sophisticated arrangement, such a frame can be used in conjunction with arbitrary advertising to convey a key needed to decrypt following video. The encoding side of such a process, as may be used by a video distributor, is shown in FIG. 3 An encryption key, which may be arbitrary (and by which following programming is encrypted), is selected or received from another process. The key may comprise, e.g., 256 binary bits. This bit string is then XOR'ed with a bit string related to a commercial. This latter bit string can be derived in any manner from the commercial (as in the case noted above). If the commercial is 15 seconds in length, and comprises 30 frames per second (i.e., 450 total frames), this commercial-related bit string may comprise, for example, the $4^{th}$ and $5^{th}$ bits in the $5^{th}$ pixel of every 3d frame, until 256 bits are thereby produced. (A hash, fingerprint, or other method can alternatively be used.) The XOR'ing can be performed at the time the commercial is inserted in the video stream sent to the subscriber. The XOR'ed output is then conveyed to the subscriber in a nearly-black video frame that follows the commercial (either immediately, or after an interval). As before, numerous such conveyance techniques can be employed, such as encoding the 256 bit XOR'ed output bits as 1 or 0 pixel values in the first 256 positions in the nearly black frame.

Figure 4:
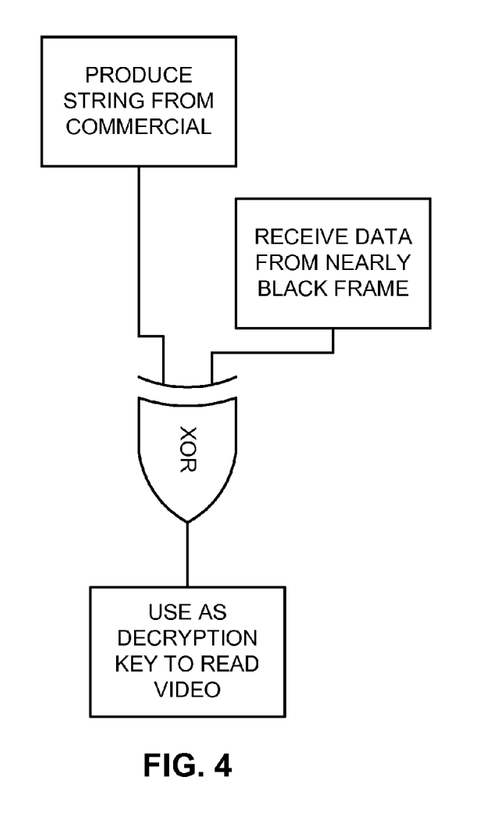
FIG. 4 shows a reciprocal arrangement, which may be applied at a viewer's premises, to recover the decryption key.

FIG. 4 shows the reciprocal method applied at the subscriber's premises to recover the key. The commercial must be rendered (e.g., decompressed) in order to produce a bit string therefrom (typically using the same method as employed in the encoding phase). The payload inserted by the distributor into the nearly black frame is also recovered. These bit strings are XOR'ed. This operation outputs the same encryption key as was originally input to FIG. 3. This key is then buffered in a memory in the subscriber's equipment, and used to decrypt video programming that follows.

It will be recognized that in such arrangements, bits must be derived from the commercial in order for following video programming to be decrypted. The commercial cannot be removed or skipped over. Yet no change to the commercial is required—it can be inserted on the fly, with no preparation, and the black frame can then be tailored in a manner allowing decoding equipment at the subscriber's premises to recover an arbitrary key from the commercial plus the black frame.

(The artisan will recognize that the information conveyed by the black frame can be conveyed in numerous other fashions. These include steganographic encoding of one or more frames—whether nearly black or otherwise. VBI and other out of band techniques can also be used to send the information. Also, it needn't follow the commercial; it can be sent previously in certain embodiments. The artisan will further understand that different elements from the arrangements just-discussed can be combined in other fashions with similar effect.)

Figure 5:
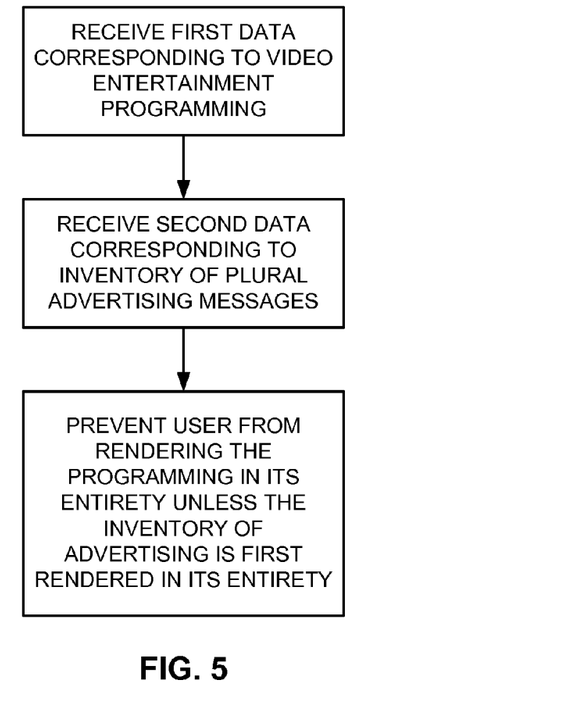
FIG. 5 illustrates an arrangement in which entertainment programming cannot be rendered in its entirety unless an associated inventory of advertising is first rendered in its entirety.

Using arrangements like that just detailed, video entertainment programming can be delivered in a manner ensuring that the viewer cannot render the programming in its entirety unless a corresponding inventory of advertising messages is first rendered in its entirety (FIG. 5). As may be recognized, this encompasses a range of possibilities.

Figure 6:
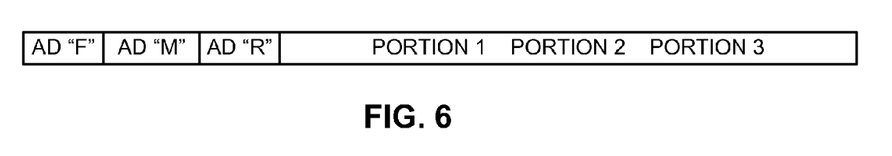
FIG. 6 shows a possible temporal arrangement of advertising and entertainment content portions, in which all of the advertising is presented before the entertainment content begins.

For example, one option is that advertisements R, F and M (in FIG. 2) can be rendered consecutively, before any entertainment programming is rendered. Then the entertainment programming can be rendered without interruption. This is shown in FIG. 6.

Another option is that Portions 1 and 2 of the entertainment programming can be rendered consecutively, without interruption. Then Advertisements R, F and M can be rendered, with the final Portion 3 of programming then rendered afterwards.

Similarly, the advertisements can be rendered in different order, e.g., FMR, FRM, MFR, either consecutively, or at intervals through the entertainment content.

A desired one of these various different arrangements can be selected by the user, e.g., using a user interface presented on the television screen or on a handheld device (e.g., remote control, smart phone, etc.). Or the selection can be made otherwise, e.g., by the distributor of the programming, or by equipment at the viewer's premises (e.g., television or settop box)—possibly in accordance with preference data earlier stored by the user, or inferred (learned) based on observance of the user's past practices, and stored by the system.

Thus, in accordance with another aspect of the present technology, a method includes receiving first data corresponding to video entertainment programming (at least a portion of which is encrypted), and receiving a listing of plural advertising messages. A user interface is presented through which the user can make selections regarding the advertising messages. For example, the user interface may allow the user to specify the timing at which, in the entertainment content, the messages are presented, and/or in what order.

Figure 7:
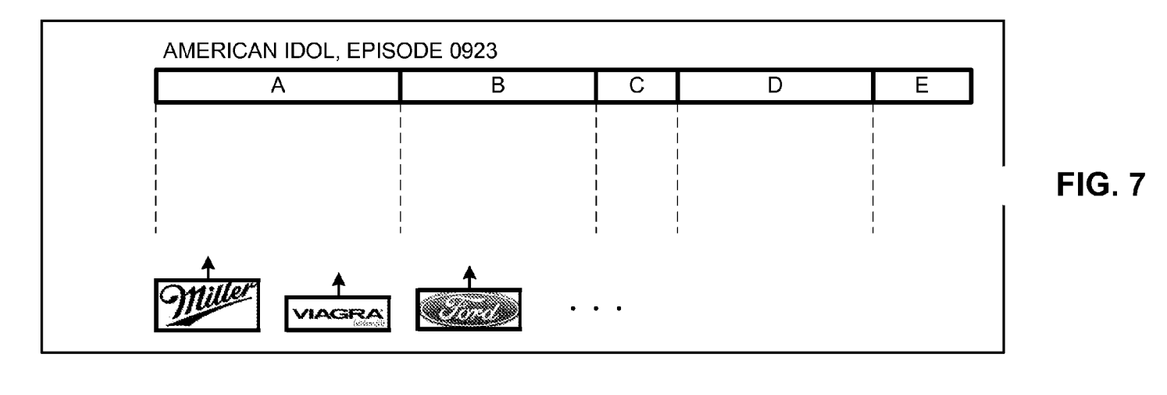
FIGS. 7 and 8 detail one form of user interface by which a viewer can select advertisements for viewing, and can specify the order and timing of their presentation.
Figure 8:
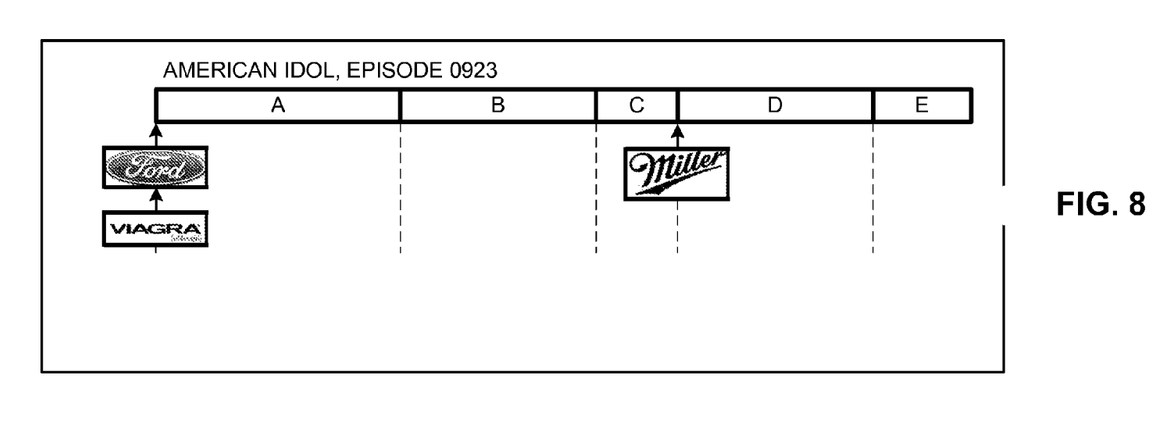

An excerpt of such a user interface is shown in FIG. 7. Along the top is a graphical timeline depicting an identified item of programming (American Idol, Episode 0923). Shown are a number of breaks in the program between which commercials may be viewed—segregating the program into portions A-E. Below are icons corresponding to different advertisements. The interface allows the user to select different of the advertisement icons, and place them at different locations in the programming (e.g., by dragging). One such arrangement, after user selection, is shown in FIG. 8.

In some implementations, the user may be presented a large number (N) of advertising messages from which to choose, and may only be required to select a lesser number (M) for viewing. Thus, rather than watching Viagra or other pharmaceutical commercials, a user may elect to view commercials for golf equipment, or travel offers, etc.

Figure 9:
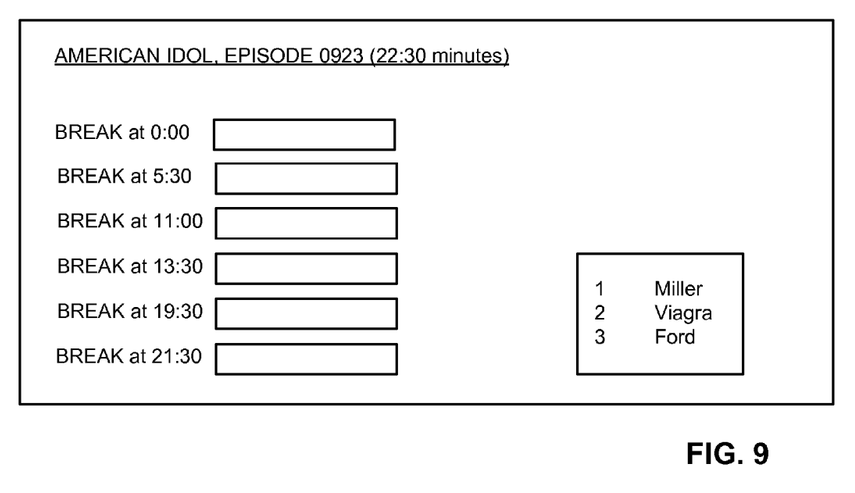
FIGS. 9 and 10 detail another form of such user interface.
Figure 10:
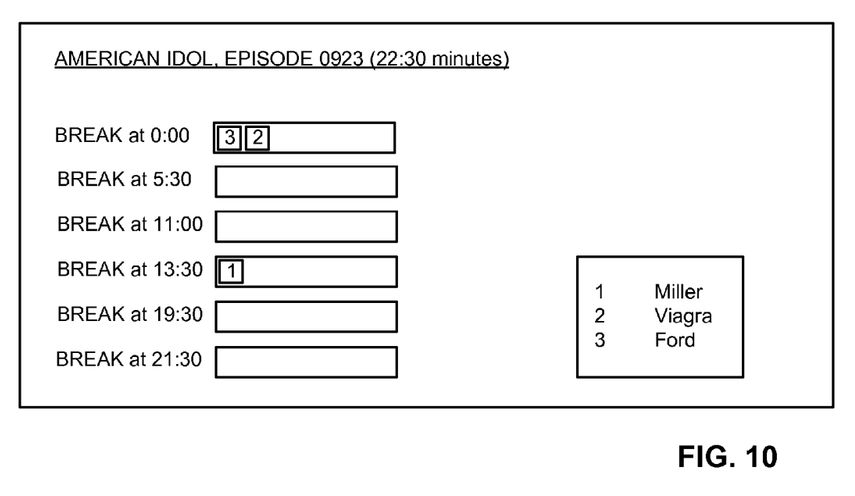

A different form of user interface is shown in FIG. 9. Here the program breaks are indicated textually, in a column, by reference to their temporal location (minutes:seconds into the program). Different advertisements are also indicated by text, and denoted with numbers. Each program break has a text entry box to the right, in which the user can type numbers to indicate particular advertisements, and their desired order. In FIG. 10, the user has selected the same arrangement of commercials as was selected in FIG. 8.

In still other arrangements, stored user preference data may determine the selection, order and/or timing of ad presentations. One viewer may consistently prefer to get through all the advertising at the beginning, and then view the entertainment content without interruption. Another viewer may welcome breaks at 15 minute intervals, while still another may prefer interruptions at 30 minute intervals, etc. Yet another viewer may prefer never to see advertisements for pharmaceuticals, or for food products. All such preference data can be stored, and used as a default to control ad presentation. (The preference data may be acquired by observing different viewers' historical selections using the FIGS. 7/8 or 9/10 interfaces, and drawing inferences as to preferences. Or it may be explicitly entered by the user, in response to questions displayed on the screen, or via another user interface construct.)

In still further arrangements, the system may adapt the order and/or timing of advertisements based on context information.

One definition of "context" is "any information that can be used to characterize the situation of an entity (a person, place or object that is considered relevant to the interaction between a user and an application, including the user and applications themselves)."

Context information can be of many sorts, including the computing context (network connectivity, memory availability, CPU contention, etc.), user context (user profile, location, actions, preferences, nearby friends, social network(s) and situation, etc.), physical context (e.g., lighting, noise level, traffic, etc.), temporal context (time of day, day, month, season, etc.), content context (subject matter, actors, genre, etc.), history of the above, etc.

A few examples of context relevant to ad presentation include whether the user is multi-tasking, e.g., with a smart phone or laptop computer during a particular interval of content (which may be sensed by traffic from the user's device on a home network), whether additional viewers have entered the room (e.g., as sensed by Bluetooth emissions from their phones), whether advertising is presently being streamed on other channels/video feeds, whether the content is being viewed live from the distributor, or rendered from the user's DVR, etc. Stored rules can be consulted based on such context, e.g., if another person enters the viewing space, present a commercial at the next opportunity.

In similar fashion, rule-based selection of ads can be made dependent on the type of content being viewed. If the content is a news program, insert ads for insurance (if available); if the content is a sports program, insert ads for Ford trucks (if available); if the content features William Shatner, insert Priceline ads (if available), etc.

In other arrangements, certain ad slots are pre-filled at the national distribution level—integrated into the MPEG bitstream issued, e.g., by NBC or Comedy Central. Other ad slots may be filled (or not) in accordance with user preference—as just described. Again, the content may be scrambled in a way requiring presentation of a full set of advertising messages in order for the content to be rendered in its entirety.

In the just-described arrangements, or in other arrangements, video entertainment programming may be interrupted to present an advertising message to the user, which the user does not wish to view. In such circumstance, the user can so-indicate—such as by operating a control on the remote control or a smart phone. In response, the advertising message is skipped, and presentation of the video entertainment programming resumes without presentment of the remainder of the advertising message. A fee is charged to the user, which may be added to the user's monthly bill. Part of this fee may be remitted by the ad distributor to the advertiser whose message was not viewed.

While the arrangement just-described allows a viewer to impulsively skip advertisements in exchange for a fee, other arrangements for viewing commercial-free programming are contemplated as well. One is for the viewer to perform an action (other than viewing an advertisement) desired by the advertiser. Or such action may have been performed previously. The action may comprise, e.g., purchasing one or more particular products/services, or purchasing products/services totaling a certain value, promoted by the marketing entity. In return, the user may be granted free, or discounted, access to a particular program, or a lineup of programming.

To illustrate, broadcast of the 2010 Masters Golf Tournament may be sponsored by Nike. If a viewer has purchased Nike products totaling more than $50 in the past six months, then a video feed of the Masters Golf Tournament may be rendered to that customer without commercials. (In some implementations, the commercials may be present in the video feed, but the set-top box or other equipment detects same, and does not render them. In some instances, the equipment may fast forward video from a storage buffer—rapidly resuming rendering of the golf programming that follows any commercial. Or it may render other golfing content in its place. Or commercials may be normally rendered, but qualified users are permitted to fast-forward through the commercials—whereas other users are prevented from fast forwarding.)

In these and other arrangements, content may be provided on a free or discounted basis, with the charge that is assessed to the viewer depending on current or historical viewer action (e.g., purchasing or other patronage history). A viewer who has spent relatively less with a sponsoring company may be assessed a larger viewing charge (albeit still discounted) than a user who has spent relatively more.

Verification that the viewer has purchased necessary merchandise within a prescribed time period can be accomplished in numerous ways. One is by data sent to Nike or a third party at the time of purchase, e.g., by a computerized cash register till, identifying the consumer, the product(s) purchased, and the price(s) paid (assuming consumer consent). This may be done through use of a Nike affinity card, presented by the user at the time of purchase—akin to a supermarket loyalty card. The point of sale terminal records an identifier associated with the user, and also stores information about the product(s) purchased. In other arrangements, a company-specific card is not employed. Instead, all purchases at a given retailer (including online retailers, e.g., Amazon) may be logged in association with a user identifier, and recalled as necessary to confirm eligibility for certain benefits.

Another way to verify that the viewer has purchased necessary merchandise is by data sent from a credit card or other payment processor—again detailing purchase-related data. Still another is by a proof of purchase provided to the customer at the time of, or following, the purchase, e.g., a digitally watermarked credential, or a cryptographically encoded barcode, identifying the purchased goods. Such proof can be scanned at home by the viewer with a suitable apparatus (e.g., a smart phone), and the resulting verification data relayed to the video distributor, Nike, or to another party. Included in the verification data may be the date the product (or credential) was produced, enabling the date of purchase to be bounded (e.g., after the production date, and on or before the date the verification data is submitted.)

In other implementations, a viewer may earn program rights, or credits, through various actions. Some involve purchases, e.g., making a $20 purchase at Amazon may earn a $2 Comcast viewing credit. But for others, no purchase is required. Watching a ten minute infomercial may merit a $1 HBO viewing credit. Sharing demographic or other information with the cable company or an audience survey company—information such as the viewer's age, or the name of the last restaurant where the viewer dined, or the contents of the internet cache maintained by browser software on the viewer's laptop—may earn a further $1 HBO credit. Taking a test drive in a new Volvo may earn a free month of Dish Network service. (The artisan will recognize a great number of other forms of viewer action that can be similarly rewarded.)

Such incentives can be accumulated and redeemed to pay for programming. Or they or may be applied otherwise, such as exchanged for merchandise or other privileges—just as airline miles can be redeemed for more than air travel.

Increasingly, users interact with second screens (e.g., laptops, smart phones) while they watch video entertainment content on big screens (e.g., television displays). Also increasingly, video entertainment content includes interactive features, such as widgets. Second screens and widgets offer opportunities for user behaviors that may be encouraged through use of incentives such as detailed herein.

For example, while watching the home improvement show "House" on Comcast, a widget may appear detailing the Maytag washing machine just shown, and offering it for sale at a significant discount, with free delivery to the viewer tomorrow. The widget can further advise the viewer that making such a purchase will also grant the viewer a $15 credit on their next cable bill. If done well, the viewer is pleased (e.g., learning more information about a product shown in the television show), Maytag benefits, House has a happy advertiser, and Comcast has made it all possible.

In a related arrangement, television entertainment sponsored by a company may be provided to viewers at variable rates, depending on the viewers' status with the company. For example, if United Airlines sponsors ESPN television, or the HBO movie channel, then it may grant its Platinum level frequent fliers with unlimited access to such programming free of charge. Gold level fliers may be assessed a $5 fee per month, whereas others must pay the customary charge, e.g., $10 or $15/month. United may grant its employees similarly subsidized access to the programming, with new employees receiving it for $5 per month, and employees with ten or more years with the company getting access for free.

Similarly, flying Alaska Airlines to Calgary may earn a viewer free access to one Calgary Flame hockey broadcast on NHL's GameCenter Live web service. Fly there twice and earn access to three Flame games. Fly there three times and get a season pass to view all the Flames games on GameCenter Live.

Relatedly, Mazda may provide free viewing of certain Mazda-sponsored television programming to all viewers who purchase a particular model of Mazda automobile (or any model of Mazda automobile). Likewise, E-Trade brokerage, or Bank of America, may offer free or reduced-fee access to television they sponsor, to account holders whose assets exceed certain thresholds.

In these, and many other embodiments, the advertiser (e.g., Mazda, E-Trade) knows the addresses of its customers (e.g., account holders). In such cases the benefit (e.g., discounted charges) can be provided to the viewer without any viewer action to demonstrate entitlement. Instead, the advertiser's customer list is compared with the video distributor's subscriber list, for corresponding names and/or addresses. Where, e.g., a Comcast subscriber is found to be an E-Trade customer, associated benefits to the viewer for being an E-Trade customer can be provided automatically, without customer action.

Some merchants mail, or email, promotional discount entitlements (e.g., gift cards/codes) to certain customers. These promotions commonly include a code that is entered by the user in connection with a transaction to obtain a benefit (e.g., obtain a $75 airline ticket for a traveling companion by entering the discount code at the time of checkout in an online purchase, or take 15% off your purchase on March 17 by entering discount code STPAT at checkout). Similar arrangements can be employed to convey television viewing benefits, e.g., with Nike emailing a Masters Golf Tournament gift code to customers who purchase golf shoes during March.

In certain embodiments, existing pay-per-view (PPV) user interfaces (UIs) for premium television are adapted for purposes described herein. For example, the UI can includes one user-selectable button, or option, that charges the PPV content to the user's monthly bill from the video provider (e.g., a cable or satellite distributor) in the customary fashion. Another user-selectable button, or option, allows the user to enter other information, e.g., to obtain the content for free or at a discount. In one particular arrangement, activation of such button brings up a screen with a graphical control into which the user can type data relating to purchases or patronage of Amazon/Bank of America/E-Trade/Mazda/Nike/etc. For example, the user may type an ID number from a Nike affinity card, or a purchase receipt ID, or a gift card/code number, or an account or membership number, etc. In some cases the viewer may simply indicate the name of a sponsor (e.g., E-Trade), triggering a check to confirm that the subscriber is an E-Trade customer (e.g., as noted above). Alternatively, entitlement to the benefit can be established by showing a credential to a camera associated with the system. Or all such functionality can be implemented through the user interface of a smart phone and its various input/output devices (e.g., touchscreen, keypad, microphone, camera, accelerometers, etc.).

In other aspects, the present technology offers enhancements for distributors of television programming.

For example, under prevailing practices, advertisers buy television ad time for fixed (negotiated) fees. Pricing may be set in accordance with historical viewership patterns, and hunches about the future. In hindsight, advertisers sometimes pay too much (e.g., advertisers who expect a playoff sports game will include two fan-favorite teams, only to be wrong). At other times they pay too little (e.g., companies who have purchased ads on CNN for a thought-to-be-boring Tuesday mid-morning, only to have viewership spike due to a disaster).

There is an increasing interest in census-based ad pricing—rates that are more dynamically tied to real viewership data. This is the prevailing model on the internet, in which advertisers pay based on the number of "clicks" their ads receive. However, not all viewers are equally desirable. And metrics for valuing different viewers (e.g., zip code data and other such demographics) don't tell the whole story.

One embodiment according to this aspect of the present technology involves tracking viewer responses to the advertising message—not in "clicks," but rather in actions taken away from the screen, such as in actual purchases.

In one particular embodiment, an advertiser is charged a base rate for television ad time, and then—after airing—is assessed a further charge based on a characteristic of viewers' responses to the ad, such as whether a viewer purchased the advertised product. An advertisement promoting Campbell's soups, for example, may involve a further charge to Campbell's of a penny for each can of soup purchased by a viewer of the advertisement within seven days after presentation of the advertisement. (This further charge may be regarded as a backend charge, which is dependent on a degree to which the ad had the intended effect of boosting sales.)

In many instances, a purchasing decision may follow repeated ad exposures. A viewer may be presented 20 Toyota ads, on different television networks, in the months leading up to a car purchase. If the viewer then purchases a Toyota vehicle, multiple ad payments may be due from Toyota. For example, the purchase may trigger a further payment of $100, divided on a per-ad basis among video distributors who presented Toyota advertisements to the viewer within the three months leading up to the purchase. Alternatively, the backend payment may be due wholly to the distributor of the ad that was presented most-immediately preceding the purchase. Other arrangements are, of course, possible.

Confirming viewer purchases can be done in a variety of ways. One is by grocery loyalty or membership cards. Many retailers keep records of individual consumers' purchasing histories through use of such cards. (E.g., the cards convey identifiers associated with database records containing customer names, dates of store visits, purchases at each visit, etc.) Television networks can contract with large grocery chains, e.g., Wal-Mart, Kroger, Safeway, Albertsons, Costco, etc., for access to certain of this consumer purchase data, subject to appropriate privacy safeguards and/or user consent. NBC may contract, for example, with Kroger and Safeway to receive information about purchases of Proctor & Gamble products, including information about the products' purchasers. NBC may similarly contract with Comcast, or Dish Network, for a feed of data listing which Proctor & Gamble product advertisements were presented to which of their subscribers. The two sets of data are then correlated, e.g., to find that Comcast subscriber Jane Doe purchased a can of Campbell's Tomato Soup on Mar. 25, 2010, after being presented a Campbell's ad on NBC's Today show, delivered by Dish Network on March 23. Campbell's owes NBC a penny. (The payment can be divided among various parties involved, including Dish Network, the local NBC affiliate, actors in the advertisement, etc.)

The identity of the viewers needn't be shared with NBC, neither by the grocery stores nor by the video distributors. Known privacy techniques can provide reliable data, without use of names.

One such technique is hashing. Customer information, such as last name, phone number, street number, and street name, can be input to a one-way hash function that produces an essentially unique identifier, from which the input information cannot be reconstructed. Thus, for example Jane Doe, with the phone number 503-555-1234, who lives at 6121 SW Evergreen St, Seattle 98006, may "hash" to the random-looking string 6F92AC356240B. That is:

Hash(Doe,503-555-1234,6121,Evergreen,98006)
=6F92AC356240B

Safeway can apply such a hash function to information about its loyalty card members before releasing their purchase information to NBC. Dish Network can similarly anonymize its subscriber information before releasing its data about Proctor & Gamble ads presented to NBC's viewers. Since the same hash function is applied to common sets of data, these random-looking strings can be correlated to confirm that certain viewers made certain product purchases, after being presented with certain advertisements. (The hash function may be made invariant to minor changes in input, e.g., due to a typographical error in spelling.)

In the arrangement just-detailed, not all purchases of Campbell's soups by Comcast subscribers are found in data maintained by Kroger and Safeway. Some subscribers shop elsewhere. Some shop without use of loyalty cards. Thus, the exemplary data is an undersampling of actual statistics. Yet it is useful as a metric for calculating backend charges.

In other arrangements, aggregate trends are noted. One week Campbell's may not air any ads (nationwide, or in a particular city, etc.) The next week Campbell's may air ads. The first week is taken as a baseline for purchase activity. Sales the second week spikes up—prompted by the ads. The difference in sales (e.g., logged by Safeway and Krogers—serving as samples, or proxies, for regional shopping activities) between the two weeks may be 15%. The advertisement distributors (e.g., NBC, Comcast) may collect a backend payment of, e.g., $2,000 for each 1% increase in sales over the baseline, for each one million people in the city or other viewing area over which the aggregate statistic was gathered.

In another arrangement, the backend payment is awarded, or is enhanced, if the viewer is a new customer for the advertised goods/services. Thus, if John Doe has a history of purchasing Campbell's soups, then a backend charge of only a quarter-cent (or zero) may be assessed to Campbell's if he makes a purchase. But if John doesn't have such a history (e.g., no Campbell's soup purchases noted in the preceding six months), then a backend charge of two cents may be made.

In these and other embodiments, customer identification techniques other than loyalty cards can also be used. For example, automobile purchases involve state registration for license plates. NBC can contract with a state's department of motor vehicles to periodically obtain lists of new vehicle registrations, with the owners' identities anonymized such as by the hashing arrangement detailed earlier. Similarly with credit card records, which may show that a person identified as 6F92AC356240B made a $59 purchase at a Nike store. As before, these anonymized identifiers can be correlated with similarly-anonymized video subscriber data, identifying ads presented to different viewing households, to serve as a basis for backend charges.

In still other arrangements, combinations of the various technologies detailed herein can be employed. For example, a viewer who owns a checking account at Bank of America may receive a $2 discount off the usual $5.95 fee paid by others to view a PPV rugby program sponsored by the bank. The viewer may claim this discount by showing a Bank of America ATM card to a smart phone camera, which extracts a watermark or other identifier from the captured imagery to confirm her identity. Additionally, the same or another sponsoring company may pay the video distributor a backend charge if the viewer soon patronizes that sponsor's business. (E.g., Verizon may pay the distributor $1 if the viewer buys a Verizon mobile phone, or a service, within seven days.)

In accordance with another aspect of the present technology, viewers are provided incentives for engaging with advertising. However, unlike prior art arrangements, the incentive is viewer-dependent.

In one such arrangement, the incentive depends on the degree to which the viewer meets the advertiser's targeted demographic profile. For example, a football game may include a Lexus commercial. Lexus is interested in affluent, middle-aged consumers—typically with conservative tastes. It is not much interested in well-to-do high schoolers, nor limited income retirees living on social security. Known demographic profiling data (such as databases compiled by market research firms, public records databases, etc.) can be mined to rank the importance of different viewers to the advertiser. Different incentives can then be provided to different viewers, e.g., in accordance with their ranking.

One way of ranking is by combining two or more viewer-related metrics to yield a score. One metric may be the average household income in the viewer's zip code. Another may be the estimated valuation of the viewer's home, e.g., as determined by tax data, or Zillow. Another might be the difference between the viewer's age and a target age (e.g., 50). Another might be the average age of vehicles registered to the viewer. These and other metrics can be weighted to different degrees in accordance with their importance, and combined, e.g., with a polynomial equation.

The following exemplary scoring equation uses input metrics M1, M2, M2 and M4 to yield a score S for each viewer (or viewing household) in an audience. Factors A, B, C, D and exponents W, X, Y and Z can be determined experimentally, or by Bayesian techniques:

$$S=(A*M1)^W+(B*M2)^X+(C*M3)^Y+(D*M4)^Z$$

The viewer engagement that is rewarded by the incentive may be as simple as viewing the advertisement. Or other types of viewer engagement, such as are described elsewhere, can be employed.

By such qualification of individual viewer value, an affluent insomniac or two watching television at 3:00 a.m. provides a market to which automated ad insertion systems can profitably sell advertising—at an hour when advertising time is otherwise almost given away.

Confirmation that a viewer has watched an advertisement can take many different forms—several of which are known in the art. One way is by a user interacting with the advertisement. This may be as simple as clicking a button during the advertisement. Another is by the user sending a text message or email to a destination specified during the advertisement.

A 45 year old viewer of a football game, living in an owner-occupied home in an affluent neighborhood, who confirms viewing of the Lexus commercial, may earn a $5 credit on a cable television bill (or other incentive). A 20 year old viewer, living in a college dorm, may earn a nickel for the same action.

Valuation of the viewers needn't be by assessing the viewers' demographic desirability to the advertiser (e.g., by reference to their relative affluence). It may be done otherwise, such as by determining different viewers' patronage to the advertiser, or other engagement with the advertiser.

This factor cuts two ways. One advertiser may reward loyalty—providing larger incentives to longstanding customers. Another advertiser may seek to incent viewers who do not yet have a history with the company.

Patronage can again be determined in various ways, such as by the customer cards and customer lists noted elsewhere.

A viewer valuation assessment can also be based on engagement with a video widget associated with the advertiser. A viewer that spends more time interacting with a widget is determined to be relatively more valuable to the advertiser, and so is provided a larger incentive than a viewer that spends less time. (Widget technology is a growing part of interactive television, with which the reader is presumed to be familiar. See, e.g., patent publications 20070061724, 20100011394 and 20100042692.)

Valuation of a viewer can also be assessed based on the viewer's historical responsiveness to advertising messages. A viewer that responds to advertising (such as by purchasing the advertised product, or patronizing sponsors of favorite programs) at an above-average rate will be valued more highly than a viewer who responds below such a norm. Responsiveness to advertising can be determined in various ways, such as by correlating ad presentations to the viewer with the viewer's purchasing history (e.g., as indicated by credit card data, point of sale data, etc.).

As in the other examples, viewers that are assessed as more highly valuable can be provided larger incentives.

In some instances, the size of the incentive (e.g., discount, rebate, coupon, privilege, etc.) can be determined after the advertising message has been presented—based on an apparent effect of the advertising message on that viewer. For example, if a televised sports event is sponsored by Nike, and the viewer makes a purchase at the online Nike store within 48 hours after the event, the viewer may receive a rebate in a percentage that increases with the amount of the purchase. So if the ad led to a $25 purchase, the viewer may receive a 10% rebate. If, however, the ad led to a $125 purchase, the viewer may receive a 20% rebate. The incentive is thus tied to the ad's apparent effectiveness on the viewer. (This rebate may be in addition to an incentive that is provided to the viewer simply for watching one or more Nike ads.)

In like fashion, the distributor of the ad (e.g., NBC and/or DirectTV) can be compensated more by Nike, via a backend payment, if the viewer spends $125 vs. $25.

Reference was made to the viewer's responsiveness to advertising. This may vary with different products. One viewer may act on lawn care ads 12% of the time (vs. a 3% national norm), but never respond to jewelry ads (vs. a 1% national norm). Another viewer may act on ads for Heinz ketchup above the national (or regional) norm, but for Best Mayonnaise well below the norm. In accordance with a further aspect of the present technology, data identifying different advertising messages provided to different viewers are logged (e.g., by the video distributor, or by an audience survey service such as The Nielsen Company). Data identifying goods/services actually purchased by these viewers are also determined. These two sets of data are correlated—identifying a relative measure of responsiveness of a particular consumer to advertising for a particular item (e.g., Campbell's Tomato Soup, or Scott's Turf Builder fertilizer), or to advertising for a particular item type or class (e.g., soup, convenience foods, groceries, lawn care products, etc.).

Again, various sources of viewer transaction data are available, including credit card data, grocery loyalty card data, account data maintained by vendors such as Amazon, etc. Third party service providers, such as The Nielsen Company and TRE Global, may collect and aggregate this and other information. In some instances viewer purchase information may be collected by, or at the direction of the viewer. For example, in exchange for a payment or other incentive, a viewer may grant a market research firm permission to access information logged by the viewer in a home finance program such as Microsoft Money, detailing their purchases as a function of date, vendor, price, etc.

This information can serve at least as a partial basis for various decisions, e.g., establishing variable pricing for video entertainment programming delivered to the viewer, or identifying advertising messages to present to the viewer. There are again options. For example, in the latter case, the selected advertising message can promote a product/service that the viewer has historically purchased. Or it can promote a product/service that appears to be new to the viewer, e.g., trying to induce the viewer to try something different. (This may involve trying to switch the viewer's brand loyalty, e.g., promoting Progresso soups to a customer that has historically purchased Campbell's soups.)

As noted, the arrangements detailed in this disclosure can involve providing entertainment content to a viewer for free or at a reduced cost. The amount of the discount can depend on the viewer's responsiveness to advertising.

In some arrangements, a variety of data can be processed to yield a score that indicates, in the aggregate, a viewer's desirability to marketers. This may regarded as akin to the Credit Score computed by Fair Isaac Co. (FICO) and used by financial institutions. Instead of indicating relative credit-worthiness, however, this score (e.g., a "consumer score") can indicate relative desirability as a viewer.

Such a score can be based on some or all of the data earlier noted, including responsiveness to ads of different types, demographic affluence, historical purchases, etc. For advertisers that do not want to undertake a product-specific investigation of various viewers, such a score may be purchased from a third party service that undertakes the associated data collection and analysis, and can be used in the applications detailed in this disclosure, as well as in others.

Just as some consumers manage their financial affairs in a manner calculated to enhance their credit score (e.g., so as to gain more favorable credit terms), and some frequent travelers plan trips and itineraries to get the most mileage out of frequent flier accounts (e.g., so as to earn free trips sooner), so too may some viewers conduct their viewing and purchasing affairs to increase their consumer score (e.g., so as to get more substantial benefits from video distributors and commercial advertisers).

In accordance with a further aspect of the present technology, a viewer can influence the advertising presented to that viewer, e.g., in accordance with the viewer's interests.

In one particular embodiment, the viewer's interests are reflected in stored profile data, associated with the viewer. This stored profile data is consulted in identifying video advertising that may be of interest to the viewer. When other advertising is encountered in video entertainment provided to the consumer, such other advertising may be replaced with the advertising identified as being of potential interest to the viewer.

Since the viewer in such embodiment makes preference information available for the purpose of increasing the effectiveness of presented advertising, the viewer may be rewarded by incentives such as detailed elsewhere herein, including free or reduced-cost video entertainment programming.

The stored profile data may include information generated by querying the viewer to identify one or more classes of video advertising that the viewer does not wish to view. In one such arrangement, the viewer operates a user interface (e.g., on a remote control, or an iPhone application)—operating a thumbs-down button (control) when an advertisement appears that the user does not want to see again. (One button activation may signal addition of that particular advertisement to a user's un-favorites list; a double-button activation—akin to a double-click—may signal that the user does not want to view any ads for any similar products.) Similarly, the user can indicate approval of other ads, e.g., by manipulating a device user interface. That particular ad, or ads for that type of product, may then be added to the user's profile data—indicating that this is an ad (or type of ad) that the viewer would be willing to watch in the future.

Other Comments

While this specification began by noting the relationship between the present technology and certain earlier patent filings, it bears repeating. These disclosures should be read in concert and construed as a whole. Applicants intend that features in each disclosure be combined with features in the others. Thus, it should be understood that the methods, elements and concepts disclosed in the present application be combined with the methods, elements and concepts detailed in those previous applications. While some have been particularly detailed in the present specification, many have not—due to the large number of permutations and combinations, and the need for conciseness. However, implementation of all such combinations is straightforward to the artisan from the provided teachings.

Having described and illustrated the principles of our inventive work with reference to illustrative features and examples, it will be recognized that the technology is not so limited.

For example, while reference has been made to televisions, set-top boxes, and smart phones, it will be recognized that this technology finds utility with all manner of devices. PDAs, organizers, portable music players, desktop computers, laptop computers, tablet computers, netbooks, ultraportables, wearable computers, portable media players, servers, etc., can all make use of the principles detailed herein.

Similarly, while repeated reference has been made to television, the artisan will recognize that the detailed arrangements are similarly applicable to other forms of content—visual and/or otherwise. Thus, for example, incentives can be provided to viewers of web content, including online advertising, based on the detailed arrangements.

Each of the detailed embodiments can be combined with features from the other embodiments, in accordance with the present technology.

While certain embodiments require the viewer to confirm viewing of advertisements (e.g., by a response sensed by a device user interface), other embodiments can proceed differently. For example, presentation of an advertisement to a viewer can be confirmed by referenced to data sensed by a portable device (e.g., a smart phone, such as an iPhone) conveyed by the user. As noted, rendering of an advertisement can also be ensured by scrambling the content in a manner that requires rendering of the advertising to unscramble.

(Additional disclosure on assuring subscriber viewing of advertising is provided in patent publications US20030012548 and US20030192060.)

The user can interact with systems that employ aspects of the present technology in a variety of ways. Some, as noted, involve manipulating the UI of a smartphone (e.g., touching buttons or other controls on a display screen). Others can include gestural input. Any form of input can be adapted to such systems.

The design of devices referenced in this disclosure is familiar to the artisan. In general terms, each typically includes one or more processors (e.g., of an Intel, AMD or ARM variety), one or more memories (e.g. RAM), storage (e.g., a disk or flash memory), a user interface (which may include, e.g., a keypad, a remote control, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and interfaces for communicating with other devices (which may be wireless, such as IR, GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented to various forms of processor circuitry, including programmable logic devices, FPGAs (e.g., Xilinx Virtex series devices), FPOAs (e.g., PicoChip brand devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices.

Software instructions for implementing the detailed functionality can be readily authored by artisans, from the descriptions provided herein, e.g., written in C, C++, Visual Basic, Java, Python, Tcl, Perl, Scheme, Ruby, etc.

Commonly, each device includes operating system software that provides interfaces to hardware resources and general purpose functions, and also includes application software which can be selectively invoked to perform particular tasks desired by a user. Known browser software, communications software, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

In addition to storing the software, the various memory components referenced above can be used as data stores for the various information utilized by the present technology.

Different of the functionality described in this specification can be implemented on different devices. For example, in a system including a set-top box with a server at a cable operator's head-end, different tasks can be performed exclusively by one device or the other, or execution can be distributed between the devices. Thus, it should be understood that description of an operation as being performed by a particular device is not limiting but exemplary; performance of the operation by another device (e.g., a remote server, or the cloud), or shared between devices, is also expressly contemplated.

In like fashion, description of data being stored on a particular device is also exemplary; data can be stored anywhere: user device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when one viewer's portable device identifies the devices of nearby friends through Bluetooth communication or the like, and involves one or more of the nearby devices in a task.)

The artisan will understand that delivery of video entertainment content and advertising can be effected with a variety of known technologies. MPEG-2 is popular, as is Adobe's Flash. Other technologies include MPEG-4, H.261, H.263 and H.264. Video data in each of these may be encrypted.

When the specification (and claims) speak of deriving information—such as a cryptographic key—from advertising, it should be recognized that algorithmic derivation (e.g., by watermark decoding or fingerprint extraction) is not all that is contemplated. For example, the information may be derived by looking it up in a database, using information related to the advertisement as an index into the database.

Location-based technologies can be included to advantageous effect in many embodiments. GPS is one such technology. Others rely on radio signaling of the sort that that commonly occurs between devices (e.g., WiFi, cellular, broadcast television). Patent publications US20090213828, US20090233621, US20090313370, and US20100045531 describe how, given several devices, the signals themselves—and the imperfect digital clock signals that control them—form a reference system from which both highly accurate time and position information can be abstracted.

Smart phones, such as the Apple iPhone, can be used in many embodiments of the present technology. Details of the iPhone, including its touch interface, are provided in Apple's published patent application 20080174570.

It should be noted that commercial implementations of the present technology will doubtless employ user interfaces different than those described in this specification. Those detailed in this document are props to aid in explanation of associated technologies. In like fashion, the detailed user modalities of interaction are illustrative only; commercial implementations will doubtless employ others.

Artisans implementing systems according to the present specification are presumed to be familiar with the various technologies involved.

While this disclosure has detailed particular ordering of acts and particular combinations of elements in the illustrative embodiments, it will be recognized that other methods may re-order acts (possibly omitting some and adding others), and other combinations may omit some elements and add others, etc.

Although disclosed as complete systems, sub-combinations of the detailed arrangements are also separately contemplated.

The detailed technology can be used in conjunction with video data obtained from the web, such as User Generated Content (UGC) obtained from YouTube<dot>com. By known arrangements, the content of video may be discerned, so that appropriate ad/content pairings can be determined on the fly (dynamically). Applicants contemplate that the technology disclosed herein can be used to enhance and extend the UGC-related systems detailed in published patent applications 20080208849 and 20080228733 (Digimarc), 20080165960 (TagStory), 20080162228 (Trivid), 20080178302 and 20080059211 (Attributor), 20080109369 (Google), 20080249961 (Nielsen), and 20080209502 (MovieLabs).

It will be recognized that the detailed processing of content signals (e.g., image signals, audio signals, etc.) includes the transformation of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed in various ways and for various purposes during processing, producing various data structure representations of the signals and related information. In turn, the data structure signals in memory are transformed for manipulation during searching, sorting, reading, writing and retrieval. The signals are also transformed for capture, transfer, storage, and output via display or audio transducer (e.g., speakers).

Many smart phones employ touchscreen interfaces—a form of gesture interface. Another form of gesture interface that can be used in embodiments of the present technology operates by sensing movement of a smart phone—by tracking movement of features within captured imagery. Further information on such gestural interfaces is detailed in Digimarc's U.S. Pat. No. 6,947,571. Gestural techniques can be employed whenever user input is to be provided to the system.

Looking further ahead, user interfaces responsive to facial expressions (e.g., blinking, etc) and/or biometric signals detected from the user (e.g., brain waves, or EEGs) can also be employed. Such arrangements are increasingly well known; some are detailed in patent documents 20010056225, 20020077534, 20070185697, 20080218472 and 20090214060. A device's camera system (and auxiliary cloud resources) can be employed to recognize such inputs, and control operation accordingly.

The present assignee has an extensive history in content identification technologies, including digital watermarking and fingerprint-based techniques.

Watermarking is the only container-independent technology available to identify discrete media/physical objects within distribution networks. It is widely deployed: essentially all of the television and radio in the United States is digitally watermarked, as are uncountable songs, motion pictures, and printed documents. By providing an indication of object identity as an intrinsic part of the object itself, digital watermarks can greatly facilitate device-object interaction based on an object's identity.

Technology for encoding/decoding watermarks is detailed, e.g., in Digimarc's U.S. Pat. Nos. 6,614,914 and 6,122,403, and patent application 20100150434; in Nielsen's U.S. Pat. Nos. 6,968,564 and 7,006,555; and in Arbitron's U.S. Pat. Nos. 5,450,490, 5,764,763, 6,862,355, and 6,845,360.

Digimarc has various other patent filings relevant to the present subject matter. See, e.g., patent publications 20070156726, 20080049971, and 20070266252.

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. Nos. 6,990,453 and 7,359,889 (both Shazam). Examples of image/video fingerprinting are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC).

In the interest of conciseness, the myriad variations and combinations of the described technology are not cataloged in this document. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect.

It will be recognized that this specification has detailed a great variety of inventive technologies. An incomplete summary includes:

A method includes receiving first data corresponding to entertainment content (e.g., video entertainment programming), and second data corresponding to an inventory of plural advertising messages. Then, a user is prevented from rendering the content in its entirety unless the inventory of advertising messages is first rendered in its entirety.

Another method includes receiving first data corresponding to entertainment content—where at least part of the first data is encrypted, and also receiving second data corresponding to an advertising message. The second data is rendered, and cryptographic key data is derived therefrom. This key data is then used to decrypt at least part of the first data.

A still further method includes receiving first data corresponding to entertainment content—where at least part of the first data is encrypted, and also receiving a listing of plural advertising messages. A user interface is presented through which a user can make a selection between the plural advertising messages. A user-selected advertising message is next rendered, and cryptographic key data is derived therefrom. This key data is then used to decrypt at least part of the first data.

Yet another method involves receiving first data corresponding to entertainment content, and second data corresponding to plural advertising messages. A user interface is presented that allows a user to control timing by which the plural advertising messages will be presented—relative to presentation of the content. The plural advertising messages are then rendered to the user in accordance with the user-controlled timing. By such arrangement the user can, e.g., (1) control two or more of the advertising messages to be rendered in a single block of time, or (2) each be rendered at spaced-apart blocks of time with at least a portion of the content interspersed therebetween.

Still another method includes presenting entertainment content to a user, and interrupting the presentation at one or more points to present an advertising message to the user. A signal is received, initiated by the user, indicating a desire to skip the advertising message. A fee is charged for the skipped message, and presentation of the content resumes without presenting the remainder of the message.

Another method includes receiving entertainment content at a user device, from a distributor. A user performs an action desired by a marketing party—other than viewing an advertising message. In consideration of such user action, the marketing party defrays some or all of a charge the user would otherwise be assessed for receiving the entertainment content.

A still further method includes receiving company-sponsored entertainment content at a user device, and assessing a variable charge to the user for the content—depending on the user's status with the company.

Yet another method includes distributing entertainment content to consumers, and charging for including a company's advertising message in the content. Consumer response to the advertising message is tracked. A further charge is then assessed for including the advertising message in the content, provided the tracked consumer response has a certain character.

Still another method includes delivering a set of entertainment content to different recipients, and charging the first recipient a first fee therefor, while charging a second recipient a different, lesser fee (or not fee). This difference in fees is due to the second recipient's patronage of one or more companies that sponsors the set of content.

A further method includes delivering entertainment content to plural subscribers, and presenting at least one advertising message in association with the content to the plural subscribers. However, the method further includes providing a first subscriber a larger incentive for presentation of the advertising message than is provided to a second subscriber, by reason of differing valuation assessments associated with the first and second subscribers, where these valuation assessments are based, at least in part, on a factor different than confirmation that one or more advertising messages has been viewed.

Another method includes receiving first data that identifies items purchased by a consumer, and second data that identifies advertising messages provided to the consumer—promoting different items. These data are correlated to indicate a relative measure of responsiveness of the consumer to advertising for a particular item.

Yet another method includes receiving first data that identifies at least certain items purchased by a consumer at a grocery chain, and receiving second data that identifies advertising messages provided to the consumer with entertainment content, where the advertising messages promote different items. These data are correlated to yield a relative measure of responsiveness of the consumer to advertising for particular items. The consumer is then rewarded, such as with free or reduced cost entertainment content.

Still another method includes accessing profile data associated with a consumer; identifying advertising related to the consumer profile; replacing other advertising with the identified advertising in content delivered to the consumer; and rewarding the consumer—such as with free or reduced cost entertainment content.

Another method includes presenting an advertising message to a consumer, and rewarding the consumer for enhanced engagement with the advertising message, where the enhanced engagement comprises more than confirming perception of the message.

Naturally, devices and software corresponding to the above-noted methods also form part of the applicants' inventive work.

To provide a comprehensive disclosure without unduly lengthening this specification, applicants incorporate-by-reference the documents and patent disclosures referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

We claim:

1. A method comprising the acts:
sending video entertainment to a user smartphone device, the video entertainment being sponsored by a retail chain, but being presented to the user free of interrupting advertisements that promote the retail chain; and
assessing a variable charge to the user for the video entertainment, depending on the user's status with the retail chain;
wherein said assessing of the user's status includes:
receiving first data that identifies at least certain items purchased by the user at the retail chain;
receiving second data that identifies advertising messages provided to the user, the advertising messages promoting different items at the retail chain;
correlating the first and second data to indicate a relative measure of responsiveness of the user to advertising for particular items at the retail chain; and
determining a free or reduced cost to assess the user for the video entertainment, based on said correlation of the data concerning advertising messages promoting items at the retail chain, and the data identifying items purchased by the user at the retail chain.

2. The method of claim 1 that further includes comparing said correlation with statistical norms based on a group of users, to identify whether said user seems to be more or less responsive to advertising for a particular item at the retail chain than said group of users, and determining the cost to assess the user for the video entertainment based on said comparing.

3. The method of claim 1 that in which the first data is based on credit card data.

4. The method of claim 1 in which the first data is based on transaction data maintained by the user, which is employed with permission of the user.

5. The method of claim 1 in which the second data is compiled by a content distributor.

6. The method of claim 1 in which the second data is compiled by an audience survey service.

7. The method of claim 1 in which the act of determining said cost additionally depends on demographic affluence data about the user.

8. The method of claim 1 in which the act of determining said cost additionally depends on a score concerning said user, obtained from a third party service.

9. A method comprising the acts:
sending a set of video entertainment programs to both first and second recipients;
charging the first recipient a first fee for the programs, and charging the second recipient a different, lesser fee, or no fee;

wherein a difference in the fees is due to the second recipient's patronage of a retail chain that sponsors the set of video entertainment programs; and wherein the method includes determining the second recipient's patronage of the retail chain by:

receiving first data that identifies plural types of different items purchased by the second recipient at the retail chain;

receiving second data that identifies advertising messages provided to the second recipient, the advertising messages promoting plural types of different items at the retail chain;

correlating the first and second data to indicate the second recipient's responsiveness to advertising for plural different types of items at the retail chain; and determining a fee to assess the second recipient, based on said correlation; and wherein the video entertainment programs are presented to the second recipient free of interrupting advertisements that promote the retail chain.

10. The method of claim 9 that further includes comparing said correlation with statistical norms based on a group of recipients, to identify whether the second recipient seems to be more or less responsive to advertising for a particular item at the retail chain than said group of recipients, and determining the fee based on said comparing.

11. The method of claim 9 that in which the first data is based on credit card data.

12. The method of claim 9 in which the first data is based on transaction data maintained by the second recipient, which is employed with permission of the second recipient.

13. The method of claim 9 in which the second data is compiled by a content distributor.

14. The method of claim 9 in which the second data is compiled by an audience survey service.

15. The method of claim 9 in which the act of determining said fee additionally depends on demographic affluence data about the second recipient.

16. The method of claim 9 in which the act of determining said cost additionally depends on a score concerning said second recipient, obtained from a third party service.

* * * * *